United States Patent [19]

Pavy et al.

[11] 4,285,899

[45] Aug. 25, 1981

[54] METHOD AND APPARATUS FOR MAKING HELICAL PLASTIC MEMBERS, AND THE MEMBERS PRODUCED

[75] Inventors: Michel Pavy, Wattignies; Rene Casaert, Lille, both of France

[73] Assignee: Nortene, Lille, France

[21] Appl. No.: 37,934

[22] Filed: May 9, 1979

[30] Foreign Application Priority Data

May 17, 1978 [FR] France ................... 78 14586

[51] Int. Cl.³ ................................ B29C 17/02
[52] U.S. Cl. ........................ 264/180; 264/210.2; 264/281; 264/285; 425/71; 425/319; 425/377
[58] Field of Search ............ 264/178 R, 557, 559, 264/560, 562, 210.2, 281, 103, 285, 339, 180; 425/71, 113, 114, 461, 322, 319, 377

[56] References Cited

U.S. PATENT DOCUMENTS

| | | |
|---|---|---|
| 1,190,134 | 7/1916 | Embrey .......................... 425/322 |
| 1,824,482 | 9/1931 | Hartmann ....................... 425/319 |
| 2,728,104 | 12/1955 | Fisch ............................ 264/210.2 |
| 3,090,998 | 5/1963 | Heisterkamp et al. ........... 264/560 |
| 3,411,182 | 11/1968 | Nevin ............................ 425/71 |
| 3,450,806 | 6/1969 | Matsuo .......................... 264/560 |
| 3,461,499 | 8/1969 | Nevin ............................ 425/113 |
| 4,120,929 | 10/1978 | Reum ............................ 264/210.2 |

*Primary Examiner*—Jeffrey R. Thurlow
*Attorney, Agent, or Firm*—Brisebois & Kruger

[57] ABSTRACT

Helical plastic members are formed by rotating an extrusion die while extruding a filament in a generally horizontal direction just above a tank of liquid. The plastic helix so formed is cooled and solidified in the liquid. A mandrel in the liquid can be used to guide the helix downwardly, and the helix is removed from the tank with extraction rollers. As a variation, the tank can rotate relative to a fixed extrusion nozzle which extrudes the plastic horizontally just above the rotating liquid in the tank.

10 Claims, 1 Drawing Figure

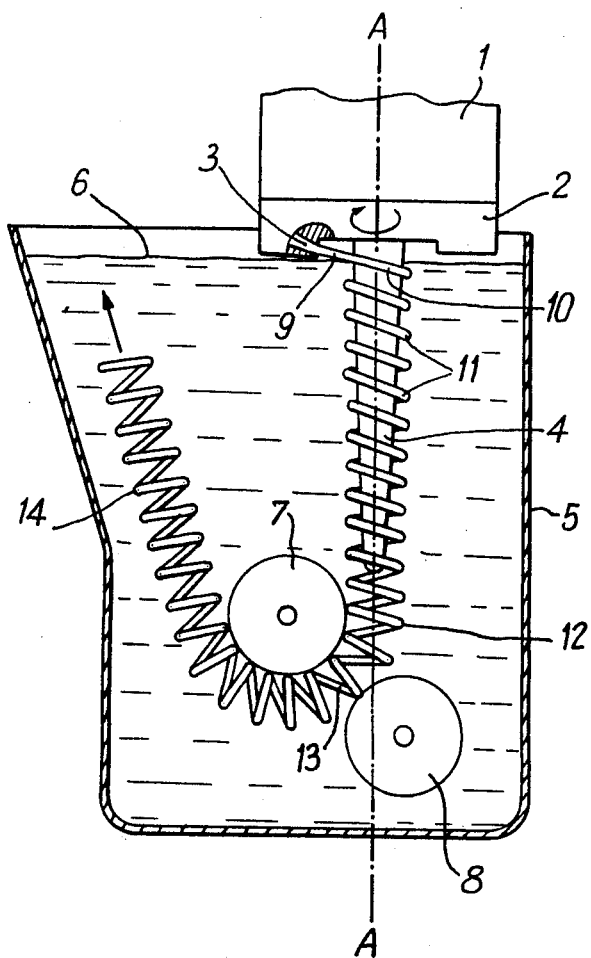

METHOD AND APPARATUS FOR MAKING HELICAL PLASTIC MEMBERS, AND THE MEMBERS PRODUCED

BACKGROUND OF THE INVENTION

The present invention relates to a process for manufacturing by extrusion helical members of plastic material, for example, in the shape of helical springs.

Such helical members can be used, for example, to surround tubing or piping which must be protected from shocks but these members can also be used in all sorts of applications.

The processes presently used to manufacture such helical elements or members consist of extruding a continuous filament of plastic material which is basically circular in section, then winding this filament helically on a fixed or rotating core or mandrel. The wound filament tends to harden as it cools so that a solid helical member finally results.

These known processes still have a certain number of disadvantages. They actually require careful implementation and precise adjustments. Moreover, they do not permit high production rates. More significant difficulties arise when an attempt is made to manufacture helical members with complex sections.

SUMMARY OF THE INVENTION

The present invention proposes to remedy these disadvantages and to provide a process for manufacturing helical members of plastic material with very high production rates and simple equipment. Moreover, the process according to the invention allows members to be manufactured in various sizes and shapes by means of very simple adjustments. Finally the process according to the invention is particularly economical to implement.

The invention also proposes to provide apparatus for practising this process which is especially simple and easy to construct, maintain and adjust.

The object of the present invention is a process for manufacturing helical members of plastic material in which a coil or filament of hot plastic material is extruded from an extrusion die characterized by the fact that the die rotates around a vertical axis, that the coil or filament is extruded from the die in a direction which is horizontal or very slightly inclined with respect to the horizontal a short distance above the surface of a mass of liquid, preferably water, so that the extruded material takes on a helical shape which becomes stabilized when it enters the water, after which the helical member is extracted from the liquid.

Preferably the helical member is formed around a vertical rod or mandrel placed in the water coaxially to the rotational axis of the die while giving the helical member a diameter clearly greater than that of the mandrel.

It must be understood that this mandrel in no way corresponds to the cores on which the plastic material is wound helically in earlier processes because the helical member according to the invention is kept spaced from the mandrel whose only function is to ensure that the coil in the liquid is maintained vertical as it moves downwardly.

The outlet angle of the plastic material from the extrusion die is nearly horizontal. Preferably it is obliquely inclined downwardly but it could also be slightly inclined upwardly. This outlet angle, when inclined toward the bottom, is advantageously less than 45°, for example, about 30° with respect to the horizontal.

The speed of rotation is preferably between 5 and 40 revolutions per second, for example, about 15 revolutions per second. Very significant outputs can be obtained, for example, 500 or more meters per hour.

The distance between the surface of the liquid and the point of extrusion is kept small, preferably about 5 mm., given that the plastic material which is still hot must enter the liquid without sagging or deflecting in a vertical or near-vertical direction under the effect of gravity.

Preferably the shaped member is extracted by deflection means to pull it toward the top and draw it out of the body of liquid.

Preferably the coil or filament is extruded in the form of a solid or hollow circular section but it can also have other sections.

Another object of the invention is an apparatus for practising this process, this apparatus being characterized by the fact that it comprises, in combination, an extrusion head or die rotatable around a vertical axis to extrude a coil or filament with an angle of extrusion which is relatively small with respect to the horizontal, a tank for holding a liquid positioned under the rotary die, and means for extracting the shaped member from the tank.

In one preferred embodiment, the device has a vertical mandrel or rod with a free lower end, and coaxial to the rotation axis, the diameter of this rod being substantially smaller than the diameter of the shaped helical member.

Advantageously the apparatus has at the bottom of the tank near the bottom end of the rod, one or more deflecting rollers whose shape allows them to direct the helical member and ensure its extraction toward the top.

Another object of the invention is a helical member of a plastic material made by the process according to the invention.

Other advantages and characteristics of the invention will be apparent from a reading of the following description, given by way of a non-limiting example, with reference to the accompanying drawing.

BRIEF DESCRIPTION OF THE DRAWING

The single FIGURE shows a schematic view in section of an apparatus according to the invention.

The FIGURE shows an apparatus according to the invention comprising a plastic material extruder 1 of which only a lower end portion is shown. At the lower end of this end portion 1 is a rotary extrusion head or die 2 driven by means of motors, not shown, to rotate in the direction indicated by the arrow around a vertical axis A—A. This die 2, which is continuously supplied with plastic material from portion 1 of the extruder, has a discharge orifice 3 eccentric with respect to axis A—A. On the drawing it may be seen that this discharge orifice 3 is oriented or directed toward axis A—A and has a geometric extrusion axis slightly inclined downwardly with respect to the horizontal at an angle, for example, of about 20°.

As a variation the die orifice 3, instead of facing toward axis A—A could be directed toward the periphery or, even better, this orifice could be directed along a tangent to the geometric circle constituting the path of rotation of die orifice 3. In the vertical plane the inclination, instead of being downwardly as shown, could equally well be upwardly.

Die 2 is extended by a tapering mandrel 4 preferably fixed in rotation but which could, as a variation, rotate with die 2. This mandrel 4 enters a tank 5 filled with water to level 6 slightly below (about a few millimeters), the bottom of die 2.

Below the lower end of mandrel 4 in the tank are two rollers 7, 8. Roller 7 deflects the shaped helical member while roller 8, acting with roller 7, drives the helical member. The rollers are shown with an outer cylindrical surface but obviously grooved rollers or any other means of deflection and/or pulling such as fixed surfaces, bands, etc., could be used.

Preferably rollers 7 and 8, when they have an outer cylindrical surface as shown, have a rim faced with a deformable sponge covering.

The process is practised as follows: extrusion head 2 rotates around its vertical axis, for example, at a speed of 15 revolutions per second, and the plastic material is extruded in the form of a filament whose initial portion is designated 9.

This portion 9 changes its angular position constantly. Moreover, since the material is deformable, the angle which portion 9 of the filament makes with the horizontal, which corresponds initially with the angle of extrusion from die orifice 3, keeps increasing due to gravity which tends to pull the filament downwardly.

Without any other intervention, of course, the filament would ultimately become vertical under the effect of gravity. However, the extruded filament rapidly enters the water in tank 5, and it can be seen that portion 10 of the filament which has just been immersed moves toward and around mandrel 4. It should also be understood that the thrust of the plastic material moving in the liquid diminishes its apparent weight thus tending to reduce the deflection at the level of portion 9. The filament having entered the water tends to cool and rapidly becomes rigid along the path shown by subjacent turns 11.

At the lower portion of mandrel 4, in area 12 the turns of the so formed member are either completely hardened or sufficiently cooled to allow the filament to be handled by deflection and/or removal methods such as rollers 7, 8. The filament which, in portion 13 is drawn by rollers 7 and 8 is, in area 14, directed toward the top and gradually extracted from the tank.

It should be understood that the helical winding of the filament does not rest on mandrel 4. Thus a helix can be obtained even with a mandrel 4 which is much smaller in diameter than that shown. Surprisingly enough, it has actually been found that this rotating extrusion into water allows, once the helical member has been started, the extruded filament which has entered the water to continue to take a helical shape. As a variation mandrel 4 may be omitted but it is still preferable to have it because its presence allows the helical member to be stabilized during formation and also guides it toward deflection means 7, 8. Moreover, at least in its upper portion the mandrel can assist in calibrating the inside surface of the windings of the shaped member.

The extrusion temperature chosen is relatively low to facilitate rapid cooling in the liquid. Thus for polypropylene a low extrusion temperature of about 180° C. is preferred.

The members of plastic material obtained have the shape of a helical strand of very consistent and regular geometry.

It has also been noted that the invention allows the diameter, size and pitch of the windings to be changed very easily, for instance by replacing die plate 2 by another, or providing means for adjusting the die plate. A large range of elements with different geometric dimensions can be manufactured, given that the process is no longer applicable from the time that the filaments become very thin and no longer have any firmness or indeed when the section of the filaments becomes very large.

In general it is preferred that the diameter, or the largest dimension of the section of the filament be between 1 and 5 mm.

Of course, in a variation of the invention, the die plate could be fixed in rotation and tank 5 holding the liquid could rotate.

On the other hand, two or more helical members could be extruded simultaneously by a rotating die plate with several extrusion nozzles spaced angularly with respect to each other.

In that case, the paraboloid meniscus at the surface of the water, when the container is rotated fast enough, could be used to allow more rapid penetration of the filament into the water by directing the extrusion nozzle 3 toward the meniscus.

While a preferred method and apparatus have been described, changes can be made without departing from the scope of the invention.

What is claimed is:

1. A method of making a plastic material helical member comprising the steps of, continuously extruding into a liquid, hot plastic material generally horizontally from an extrusion orifice located near the surface of the liquid, while simultaneously rotating the extrusion orifice relative to the liquid about a generally vertical axis spaced from the extrusion orifice to form a helical plastic material shape about said axis, causing said helical shape to stabilize in the liquid, and removing the so formed helical member from the liquid.

2. A method according to claim 1 wherein said step of extruding comprises, extruding from an extrusion orifice slightly above the surface of the liquid during said extruding and rotating.

3. A method according to claim 1 wherein said step of rotating comprises rotating said extrusion orifice about said axis.

4. A method according to claim 1 wherein said step of rotating comprises, rotating about a mandrel in said liquid and coaxial with the vertical axis to form around the mandrel, a helical member with an inside diameter greater than the diameter of the mandrel.

5. A method according to claim 1 wherein said step of extruding generally horizontally comprises, extruding the plastic material through the extrusion orifice at an outlet angle of less than 45° with horizontal.

6. A method according to claim 2 wherein said step of extruding comprises extruding from an extrusion orifice about 5 mm above the surface of the liquid.

7. A method according to any one of claims 1 to 5 wherein, said step of rotating comprises, rotating at a speed of between 5 and 40 revolutions per second.

8. A method according to claim 1 wherein said step of removing the helical member from the liquid comprises deflecting the helical member upwardly toward the surface of the liquid and removing the member from the surface.

9. Apparatus for forming a helical plastic member comprising an extruder having an extrusion orifice rotatable about a generally vertical axis spaced from the orifice while plastic material is extruded through the orifice; means to rotate said orifice; a tank containing liquid below the extrusion orifice; said extrusion orifice comprising means for extruding the plastic material generally horizontally about said axis and into said liquid while said orifice is rotating, to form a helical plastic shape, and means in said tank for extracting the helical shaped member.

10. Apparatus according to claim 9 further comprising, a mandrel in said liquid coaxial with the vertical axis about which said extrusion orifice rotates, and about which said plastic material is extruded to form the helix, said mandrel having a diameter substantially less than the inside diameter of the helical member.

* * * * *